(12) United States Patent
Iguchi et al.

(10) Patent No.: US 6,734,258 B2
(45) Date of Patent: May 11, 2004

(54) PROTECTIVE COATING COMPOSITION FOR DUAL DAMASCENE PROCESS

(75) Inventors: Etsuko Iguchi, Machida (JP); Jun Koshiyama, Fujisawa (JP); Kazumasa Wakiya, Chigasaki (JP)

(73) Assignee: Tokyo Ohka Kogyo Co., Ltd., Kawasaki (JP)

( * ) Notice: Subject to any disclaimer, the term of this patent is extended or adjusted under 35 U.S.C. 154(b) by 0 days.

(21) Appl. No.: 10/011,277

(22) Filed: Dec. 11, 2001

(65) Prior Publication Data

US 2002/0077426 A1 Jun. 20, 2002

(30) Foreign Application Priority Data

Dec. 20, 2000 (JP) ........................................ 2000-387638

(51) Int. Cl.$^7$ .................................................. C08F 8/30
(52) U.S. Cl. .................... 525/329.7; 525/375; 525/379; 525/381
(58) Field of Search ................................ 525/375, 379, 525/381, 329.7

(56) References Cited

U.S. PATENT DOCUMENTS 4,575,536 A  * 3/1986 Yamada ..................... 525/162
5,830,581 A  * 11/1998 Masuda ..................... 428/463
6,013,326 A    1/2000 Flosbach et al.
6,017,639 A  * 1/2000 Higginbotham ............. 428/458
6,063,448 A    5/2000 Duecoffre et al.
6,080,296 A    6/2000 Lieverz et al.
6,146,707 A   11/2000 Sapper et al.
6,391,472 B1 * 5/2002 Lamb, III ................... 428/624

* cited by examiner

*Primary Examiner*—Bernard Lipman
(74) *Attorney, Agent, or Firm*—Wenderoth, Lind & Ponack, L.L.P.

(57) ABSTRACT

The invention discloses a protective coating solution suitable for forming a resinous protective coating layer on a patterned resist layer in the manufacture of semiconductor devices having, in particular, crowdedly hole-patterned areas and areas of an isolated hole pattern. The essential ingredients of the solution are (A) a resinous compound such as an acrylic resin and (B) a crosslinking compound such as a triazine compound which are combined in such a proportion of 2:8 to 4:6 by weight that the overall weight-average molecular weight of the components (A) and (B) is in the range from 1300 to 4500. This inventive coating solution is advantageous in respect of evenness in the thickness of the coating layer even on a patterned resist layer having a crowdedly hole-patterned area and an isolatedly hole-patterned area and absence of unfilled voids within the hole patterns.

4 Claims, 1 Drawing Sheet

DENSE AREA    ISO AREA

DENSE AREA    ISO AREA

PROTECTIVE COATING COMPOSITION FOR DUAL DAMASCENE PROCESS

BACKGROUND OF THE INVENTION

The present invention relates to a protective coating composition for dual damascene process or, more particularly, relates to a coating composition to form a protective coating film on a finely patterned resist layer used in the dual damascene process, which is capable of planarizing a patterned resist surface having a level difference between areas with a densely crowded pattern and areas with an isolated pattern.

In connection with semiconductor silicon-based integrated circuits, use of copper as a wiring material is under studies in recent years to provide a solution for the problems due to wiring resistance or wiring delay. In place of the conventional prior art method for the formation of wiring in an electronic device by etching of a thin metal film, the so-called dual damascene process is also highlighted, in which wiring of a metallic material is formed by implanting the material by plating. When formation of a via hole is followed by the formation of a trench hole by this dual damascene process, it sometimes occurs that the wiring material provided in advance on the substrate surface is damaged during formation of the trench after formation of the hole so that such damage is prevented by forming a protective film within the hole. The requirements for this protective film include the antireflection characteristic to reduce reflection of the exposure light on the substrate surface, implanting characteristic for complete filling of the hole not to leave an unfilled space and planarizing characteristic to keep constancy of the substrate thickness after implantation.

While the material for forming the protective film is usually an organic material such as a photoresist composition suitable for development with an alkaline developer solution (Japanese Patent Kokai 10-223755), such an organic material is disadvantageous because, when the hole has a relatively large aspect ratio, a bubble or void is formed in the course of the baking treatment within the hole to decrease the protecting effect on the metallic material and, in addition, when a protective coating film is formed by coating the substrate surface having a densely patterned area (referred to as the Dense area hereinafter) and isolatedly patterned area (referred to as the Iso area hereinafter) as is illustrated in FIG. 1, the film thickness cannot be even adversely influencing the succeeding trench-forming step by the photolithographic process.

SUMMARY OF THE INVENTION

The present invention accordingly has an object, in view of the above described problems in the prior art to provide a coating composition capable of giving a protective coating layer on a patterned resist layer having a hole pattern, which is free from occurrence of a void within the hole even when the aspect ratio of the hole is great and which has a fully planarized surface with evenness of the film thickness when the protective coating layer is formed on a patterned resist layer having both of Dense areas and Iso areas.

Thus, the present invention provides a protective coating composition for a dual damascene process comprising (A) a resinous ingredient and (B) a crosslinking agent dissolved in an organic solvent of which the weight proportion of the resinous ingredient as the component (A) and the crosslinking agent as the component (B) is in the range from 2:8 to 4:6 and the overall weight-average molecular weight of the solid matter, i.e. components (A) and (B), is in the range from 1300 to 4500.

DETAILED DESCRIPTION OF THE PREFERRED EMBODIMENTS

Figure 1:
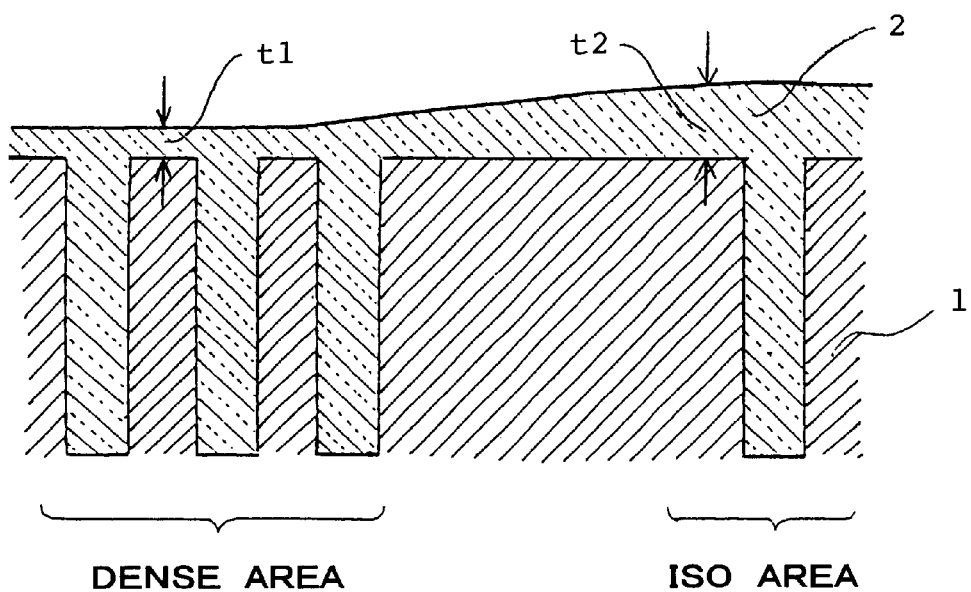
FIG. 1 is a schematic cross sectional illustration of a conventional protective coating layer 2 formed on an unevenly hole-patterned resist layer 1.

The protective coating composition provided by the invention is a solution prepared by dissolving a solid matter consisting of (A) a resinous ingredient and (B) a crosslinking agent in an organic solvent.

Examples of the resinous compounds suitable as the component (A) of the inventive composition include polyamide acids, polysulfones, halogen-containing polymers, polybutene sulfonic acids and acrylic resins, of which particularly preferable are polymers obtained by the polymerization of an ester of acrylic or methacrylic acid with an hydroxyl compound having at least one hydroxyl group in a molecule such as bisphenylsulfone compounds, benzophenone compounds, anthracene compounds and naphthalene compounds and copolymers of a monomer mixture including the above mentioned (meth)acrylic ester.

Such a (meth)acrylic acid ester compound as the monomer is represented by the general formula $$CH_2\text{—}CR^1\text{—}CO\text{—}O\text{—}R^2, \qquad (I)$$

in which $R^1$ is a hydrogen atom or a methyl group and $R^2$ is a monovalent organic group derived from a hydroxyl-containing organic compound selected from bisphenylsulfone compounds, benzophenone compounds, anthracene compounds and naphthalene compounds having at least one hydroxyl group in a molecule by removing the hydrogen atom of a hydroxyl group.

Namely, the resinous ingredient as the component (A) is a polymer of the above defined (meth)acrylic acid ester represented by the general formula (I) or a copolymer obtained from a monomer mixture consisting of the monomer of the general formula (I) and an alkyl (meth)acrylate compound.

The group denoted by $R^2$ in the general formula (I) is exemplified by monovalent bisphenylsulfone residues or monovalent benzophenone residues represented by the general formula

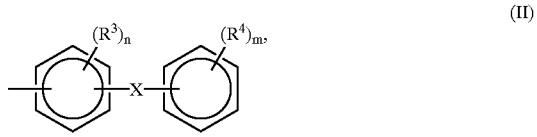

(II)

in which X is a divalent group of —$SO_2$— or —CO—, $R^3$ and $R^4$ are, each independently from the others, a hydrogen atom, hydroxyl group, alkyl group, alkoxy group, halogen atom, amino group, dialkylamino group, carboxyl group, tert-butoxy group, tert-butoxycarbonyloxy group, alkoxyalkyl group, hydroxyalkyl group, tetrahydropyranyloxy group or tetrahydrofuranyloxy group, the subscript m is a positive integer not exceeding 5 and the subscript n is a positive integer not exceeding 4, monovalent anthracene residues represented by the general formula

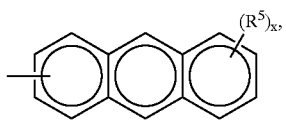 (III)

in which $R^5$ is a hydroxyl group, alkyl group, alkoxy group, halogen atom, amino group, dialkylamino group, carboxyl group, tert-butoxy group, tert-butoxycarbonyloxy group, alkoxyalkyl group, hydroxyalkyl group, tetrahydropyranyloxy group or tetrahydrofuranyloxy group and the subscript x is a positive integer not exceeding 8 and monovalent naphthalene residues represented by the general formula

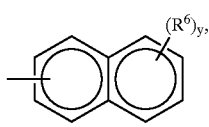 (IV)

in which $R^6$ is a hydroxyl group, alkyl group, alkoxy group, halogen atom, amino group, dialkylamino group, carboxyl group, tert-butoxy group, tert-butoxycarbonyloxy group, alkoxyalkyl group, hydroxyalkyl group, tetrahydropyranyloxy group or tetrahydrofuranyloxy group and the subscript y is a positive integer not exceeding 6.

Examples of the monomeric compound constituting the resinous ingredient as the component (A) of the inventive composition include:

bis(4-hydroxyphenyl)sulfone, bis(3-hydroxyphenyl) sulfone, bis(2-hydroxyphenyl)sulfone, bis(2,4-dihydroxyphenyl)sulfone, bis(3,4-dihydroxyphenyl) sulfone, bis(3,5-dihydroxyphen-yl) sulfone, bis(3,6-dihydroxyphenyl)sulfone, bis(3,5-dimethyl-4-hydroxyphenyl) sulfone, and the compounds derived from these compounds by substituting, for the hydroxyl groups but at least one, tert-butoxy groups, tert-butoxycarbonyloxy groups, ethoxyethoxy groups and tetrahydropyranyloxy groups;

2,4-dihydroxybenzophenone, 2,3,4-trihydroxybenzophenone, 2,2',4,4'-tetrahydroxybenzophenone, 2,2',5,6'-tetrahydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,6-dihydroxy-4-methoxybenzophenone, 2,2'-dihydroxy-4,4',-dimethoxybenzophenone, 4-amino-2'-hydroxybenzophenone, 4-dimethylamino-2'-hydroxybenzophenone, 4-diethylamino-2'-hydroxybenzophenone, 4-dimethylamino-4'-methoxy-2'-hydroxybenzophenone, 4-dimethylamino-2',4',-dihydroxybenzophenone, 4-dimethylamino-3',4'-dihydroxybenzophenone, and the compounds derived from these compounds by substituting, for the hydroxyl groups but at least one, tert-butoxy groups, tert-butoxycarbonyloxy groups, ethoxyethoxy groups and tetrahydropyranyloxy groups;

and condensation products between 1-hydroxy anthracene, 9-hydroxy anthracene, 1,2-dihydroxy anthracene, 1,5-dihydroxy anthracene, 9,10-dihydroxy anthracene, 1,2,3-trihydroxy anthracene, 1,2,3,4-tetrahydroxy anthracene, 1,2,3,4,5,6-hexahydroxy anthracene, 1,2,3,4,5,6,7,8-octahydroxy anthracene, 1-hydroxymethyl anthracene, 9-hydroxymethyl anthracene, 1-hydroxyethyl anthracene, 9-hydroxyethyl anthracene, 9-hydroxyhexyl anthracene, 9-hydroxyoctyl anthracene, 9,10-di(hydroxymethyl) anthracene, 9-anthracene carboxylic acid, glycidylanthracene carboxylic acid, glycidylanthrylmethyl alcohol, anthrylmethyl alcohol and a polyvalent carboxylic acid such as oxalic acid, malonic acid, methylmalonic acid, ethylmalonic acid, dimethylmalonic acid, succinic acid, methylsuccinic acid, 2,2-dimethylsuccinic acid, glutaric acid, adipic acid and pimelic acid as well as 1-naphthol, 2-naphthol, naphthalenediol, naphthalenetriol, 1-naphthalene methanol, 2-naphthalene methanol, 1-(2-naphthyl)ethanol, naphthalenecarboxylic acid, 1-naphthol-4-carboxylic acid, 1,8-naphthalenedicarboxylic acid and naphtholsulfonic acid.

It is preferable that the substituent group represented by the general formula (II), (III) or (IV) has as high as possible absorption to light of the wavelength for light exposure. For example, benzophenone-based substituent groups are preferable when exposure is performed with the i-line light of 365 nm wavelength and sulfone-based or anthracene-based substituent groups are preferable for the KrF excimer laser beams of 248 nm wavelength. These resinous ingredients as the component (A) should preferably have a weight-average molecular weight in the range from 4000 to 15000.

The crosslinking agent as the component (B) in the inventive composition is a compound having functional groups in the molecule, which can form crosslinks under heating by the reaction between molecules of the compound per se or by the reaction of the compound with the resinous ingredient as the component (A). Suitable compounds as the crosslinking agent include those compounds having, in a molecule, at least two amino groups substituted by a hydroxyalkyl group and/or alkoxyalkyl group as exemplified by nitrogen-containing organic compounds such as melamine, urea, guanamine, benzoguanamine, glycoluril, succinylamide and ethyleneurea substituted by methylol groups and/or alkoxymethyl groups for the hydrogen atoms of the amino groups.

The above named nitrogen-containing compounds can be prepared by the condensation reaction of formaldehyde with melamine, urea, guanamine, benzoguanamine, glycoluril, succinylamide or ethyleneurea in boiling water to effect methylolation of the compound, optionally, followed by alkoxylation of the methylolated compound by the reaction with a lower alcohol such as methyl, ethyl, n-propyl and isopropyl alcohols.

Examples of particularly preferable nitrogen-containing organic compounds among the above named ones in respect of good crosslinking reactivity include those triazine compounds represented by the general formula

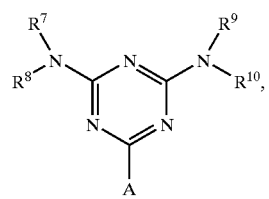 (V)

in which A is a hydrogen atom, alkyl group, aralkyl group, aryl group or substituted or unsubstituted amino group of the formula $-NR^{11}R^{12}$ and $R^7$, $R^8$, $R^9$, $R^{10}$, $R^{11}$ and $R^{12}$ are each, independently from the others, a hydrogen atom, methylol group or alkoxymethyl group with the proviso that at least two of the $R^7$ to $R^{12}$ groups in a molecule are methylol groups and/or alkoxymethyl groups. It is more preferable that the average number of the methylol and/or alkoxymethyl groups per triazine ring of these triazine compounds is 3 or larger but smaller than 6.

A great variety of commercial products are available as the examples of the above described triazine compounds and benzoguanamine compounds including MX-750 having 3.7 methoxy-methyl groups on an average per triazine ring and MW-30 having 5.8 methoxymethyl groups on an average per triazine ring (each a product by Sanwa Chemical Co.) as well as methoxymethylated melamines such as Cymels 300, 301, 303, 350, 370, 771, 325, 327, 703 and 712, methoxymethylated butoxymethylated melamines such as Cymels 235, 236, 238, 212, 253 and 254, butoxymethylated melamines such as Cymels 506 and 508, carboxyl group-containing methoxymethylated isobutoxymethylated melamines such as Cymel 1141, methoxymethylated ethoxymethylated benzoguanamines such as Cymel 1123, methoxymethylated butoxymethylated benzoguanamines such as Cymel 1123-10, butoxymethylated benzoguanamines such as Cymel 1128 and carboxyl group-containing methoxymethylated ethoxymethylated benzoguanamines such as Cymel 1125-80 (each a product by Mitsui Cyanamide Co.). Commercial products of the glycoluril compounds include butoxymethylated glycolurils such as Cymel 1170 and methylolated glycolurils such as Cymel 1172. These crosslinking compounds can be used in the inventive composition either singly or as a combination of two kinds or more. It is preferable that the component (B) is selected from these compounds of which the weight-average molecular weight is in the range from 500 to 1000.

It is the requirement of the present invention that the solid matter contained in the inventive composition consisting of the above described (A) resinous ingredient and (B) the crosslinking compound has an overall weight-average molecular weight in the range from 1300 to 4500 or, preferably, from 2000 to 4000. When this value is too large, an unfilled space called a void is formed inside of the hole pattern resulting in a decrease in the effectiveness of the protective coating film while, when this value is too small, the film thickness difference is so large between the Dense areas and Iso areas that a great difficulty is encountered in the control of the etching treatment undertaken subsequently. The overall weight-average molecular weight of the solid matter in the composition can be determined by the gel permeation chromatographic method using an instrument Model GPC SYSTEM-21 (manufactured by Shodex Co.) equipped with a column filled with polystyrene-based gel particles.

The organic solvent used in the inventive composition is not particularly limitative provided that the above described components (A) and (B) can be dissolved in the solvent. Examples of suitable organic solvents include ketones such as acetone, methyl ethyl ketone, cyclopentanone, cyclohexanone, methyl isoamyl ketone, 2-heptanone and 1,1,1-trimethyl acetone, polyhydric alcohols and derivatives thereof such as ethyl-eneglycol, ethyleneglycol monoacetate, diethyleneglycol and diethyleneglycol monoacetate as well as monomethyl, monopropyl, monobutyl and monophenyl ethers thereof, cyclic ethers such as dioxane and esters such as ethyl lactate, methyl acetate, ethyl acetate, butyl acetate, methyl pyruvate, ethyl pyruvate, methyl 3-methoxypropionate and ethyl 3-ethoxy-propionate. These organic solvents can be used either singly or as a mixture of two kinds or more.

It is optional that a surface active agent is added to the protective coating composition of the present invention with an object to improve workability of coating or to prevent striation on the coating layer. A variety of commercial products of fluorine-containing surface active agents are suitable for the purpose including Surflons SC-103 and SR-100 (each a product of Asahi Glass Co.), EF-351 (a product by Tohoku Hiryo Co.) and Fluorads Fc-431, Fc-135, Fc-98, Fc-430 and Fc-176 (each a product by Sumitomo 3M Co.). The amount of the surface active agent, when added to the inventive composition, should not exceed 2000 ppm by weight based on the total amount of the solid ingredient in the composition.

While the protective coating composition is used to form a protective coating layer on a patterned resist layer in an uneven pattern distribution including Dense areas and Iso areas, the Dense area has a plurality of hole patterns in a crowded distribution keeping a distance of several times or smaller of the hole diameter between adjacent holes, as is illustrated in FIG. 1 by a schematic cross sectional view, and the Iso area has an isolated hole pattern keeping a larger distance from adjacent hole patterns.

In the following, the present invention is described in more detail by way of Examples and Comparative Examples. The patterned resist layer having Dense areas and Iso areas used as a model in these Examples and Comparative Examples had a Dense area having three hole patterns of each 250 nm diameter arranged by keeping a distance of 500 nm between adjacent holes and an Iso area having a single hole pattern of the same diameter keeping a distance of 5000 nm from the nearest hole pattern in the Dense area.

Example 1.

A protective coating solution was prepared by dissolving, in propyleneglycol, an acrylic resin having a dihydroxyphenyl sulfone structure and a weight-average molecular weight of 5821 (PAC 102, a product by Daito Co.) and a melamine compound having a weight-average molecular weight of 599 (MX-750, a product by Sanwa Chemical Co.) in combination of 6:4 by weight proportion to make up an overall solid concentration of 2% by weight. The overall weight-average molecular weight of the solid ingredients was equal to 4226.

Figure 2:
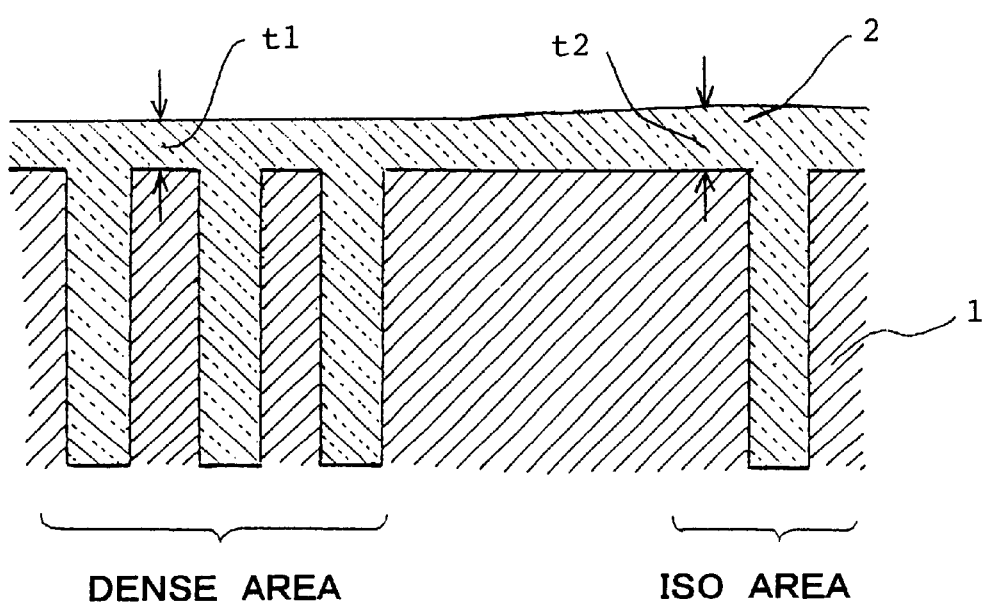
FIG. 2 is a schematic cross sectional illustration of a protective coating layer 2 formed by using the inventive coating composition on an unevenly hole-patterned resist layer 1.

A hole-patterned resist layer having a Dense area and an Iso area as described above was coated with this protective coating solution by using a spinner followed by a baking treatment at 180° C. for 90 seconds to form a protective coating layer thereon. The cross section of the thus obtained protective coating layer on the hole-patterned resist layer was examined on a scanning electron microscope to find that no voids were included within the hole pattern and the difference in the thickness of the coating layer between the Dense area and Iso area, i.e. (t2−t1) in FIG. 2, was about 243 nm.

Example 2.

The experimental procedure was substantially the same as in Example 1 except that the weight proportion of PAC 102 and MX-750 in the formulation of the protective coating solution was 4:6 instead of 6:4 so that the overall weight-average molecular weight of the solid ingredients was 3235. The result of the scanning electron microscopic inspection of the cross section of the coating layer was that no void was detected within the hole patterns and the difference in the thickness of the coating layer between the Dense area and Iso area, i.e. (t2−t1) in FIG. 2, was around 209.5 nm.

Comparative Example 1.

The experimental procedure was substantially the same as in Example 1 except that the weight proportion of PAC 102 and MX-750 in the formulation of the protective coating solution was 8:2 instead of 6:4 so that the overall weight-average molecular weight of the solid ingredients was 5086. The result of the scanning electron microscopic inspection of the cross section was that filling of the hole pattern was incomplete due to occurrence of a void within the holes.

Comparative Example 2.

The experimental procedure was substantially the same as in Example 1 except that the weight proportion of PAC 102 and MX-750 in the formulation of the protective coating solution was 1:9 instead of 6:4 so that the overall weight-average molecular weight of the solid ingredients was 1268. The result of the scanning electron microscopic inspection of the cross section was that no void was detected within the hole patterns but the difference in the thickness of the coating layer between the Dense area and Iso area, i.e. (t2−t1) in FIG. 1, was 425.2 nm adversely affecting the subsequent photolithographic steps.

What is claimed is:

1. A protective coating composition for a dual damascene process in the form of a uniform solution comprising (A) a resinous ingredient and (B) a crosslinking agent dissolved in an organic solvent of which the weight proportion of the resinous ingredient as the component (A) and the crosslinking agent as the component (B) is in the range from 2:8 to 4:6 and wherein the resinous ingredient as the component (A) has a weight-average molecular weight in the range from 4000 to 15000, the crosslinking agent as the component (B) has a weight-average molecular weight in the range from 500 to 1000 and the overall weight-average molecular weight of the components (A) and (B) is in the range from 1300 to 4500.

2. The protective coating composition as claimed in claim 1 in which the overall weight-average molecular weight of the components (A) and (B) is in the range from 2000 to 4000.

3. The protective coating composition as claimed in claim 1 in which the resinous ingredient as the component (A) is an acrylic resin.

4. The protective coating composition as claimed in claim 1 in which the crosslinking agent as the component (B) is a triazine compound.

* * * * *